March 25, 1947.  J. FRENCH  2,417,977
COOK STOVE AND RANGE
Filed March 4, 1943  4 Sheets-Sheet 1
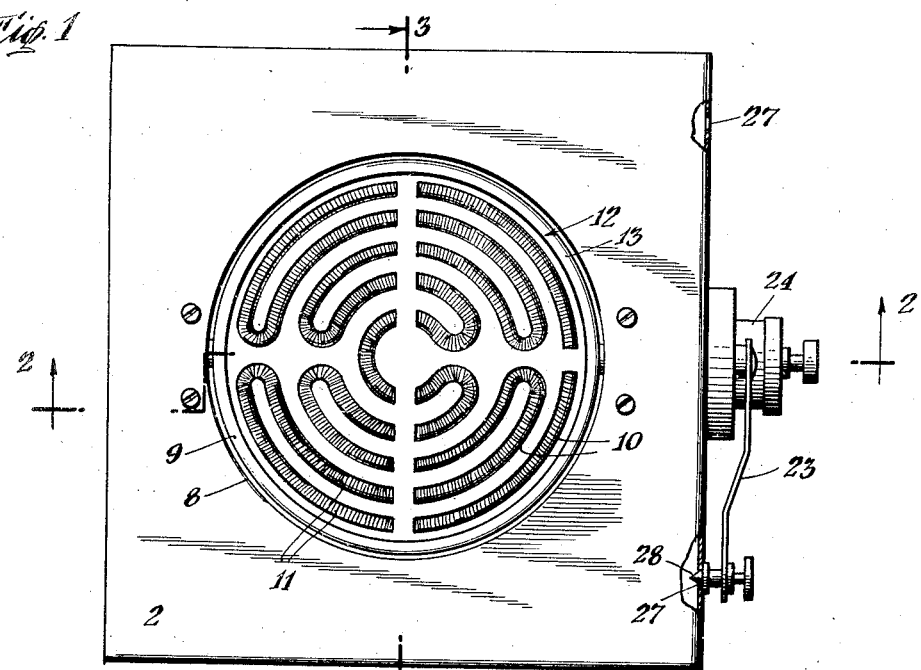
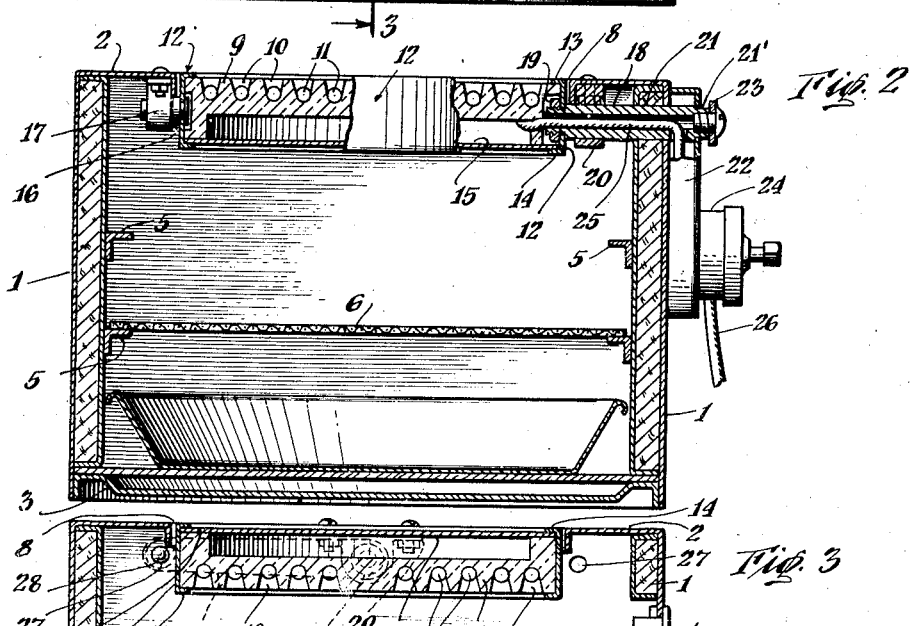
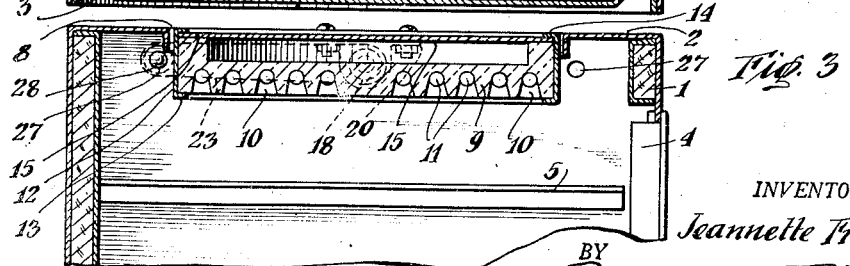
INVENTOR.
Jeannette French
BY Frederick W. Barker
ATTORNEY March 25, 1947.  J. FRENCH  2,417,977
COOK STOVE AND RANGE
Filed March 4, 1943  4 Sheets-Sheet 2

INVENTOR
Jeannette French
BY
Frederick W Barker
ATTORNEY

March 25, 1947.   J. FRENCH   2,417,977
COOK STOVE AND RANGE
Filed March 4, 1943   4 Sheets-Sheet 3
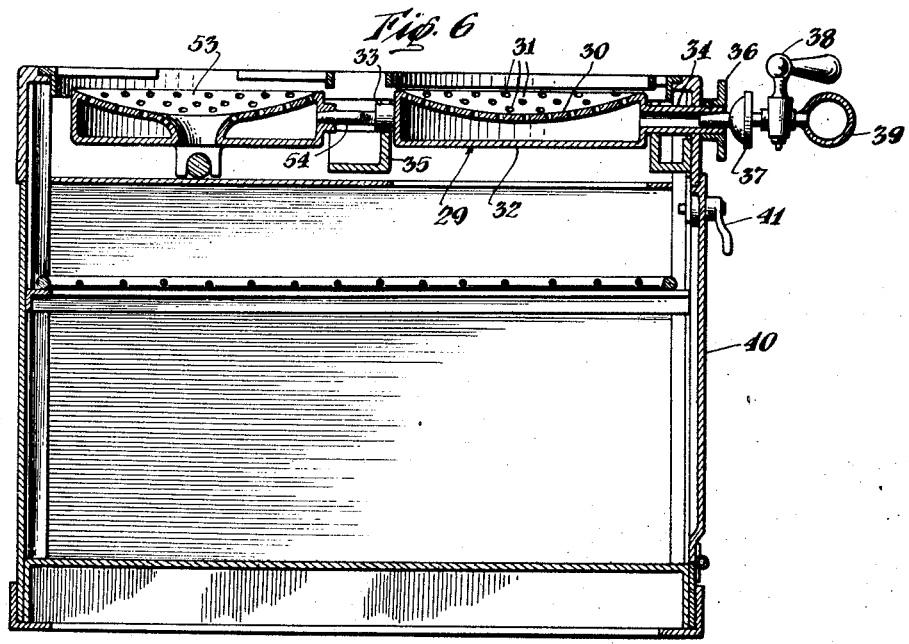
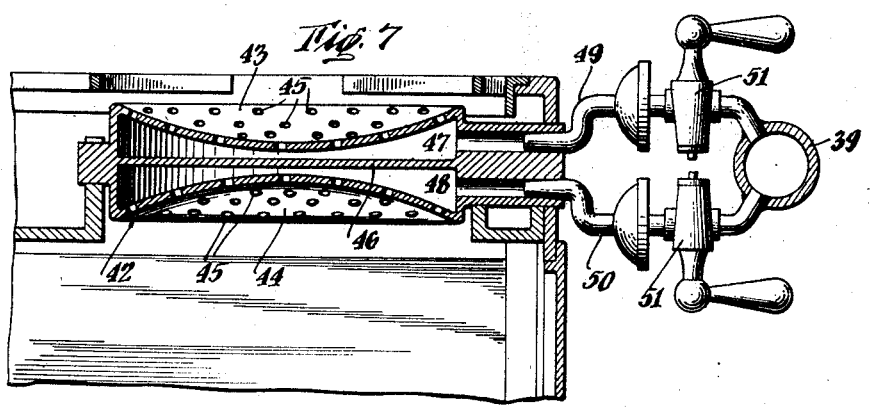
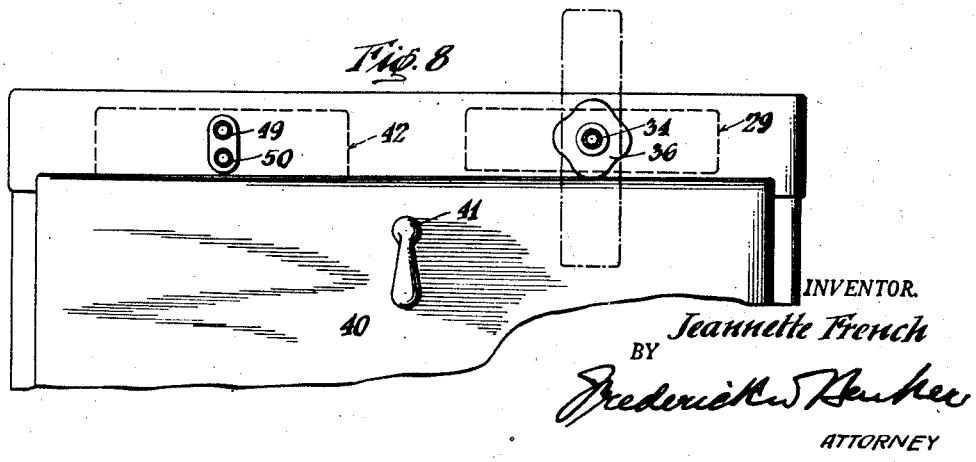
INVENTOR.
Jeannette French
BY
Frederick W. Henker
ATTORNEY March 25, 1947.                J. FRENCH                2,417,977
                            COOK STOVE AND RANGE
                         Filed March 4, 1943          4 Sheets-Sheet 4
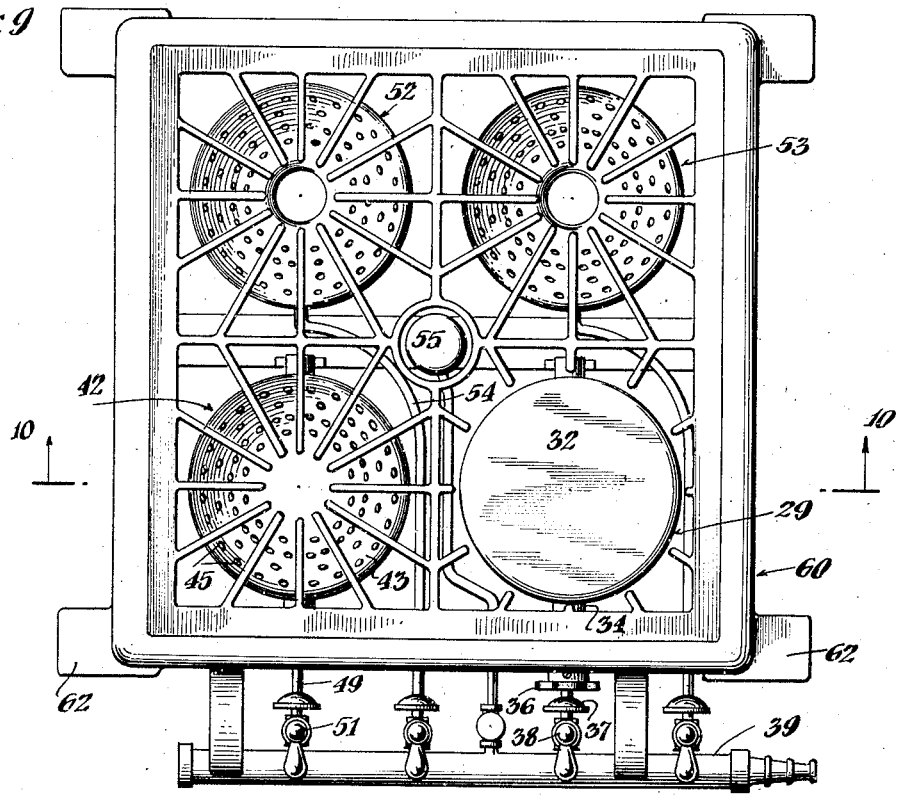
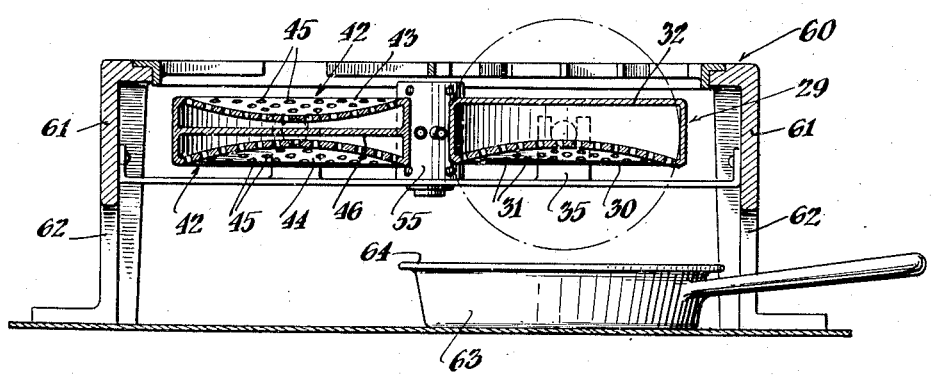
INVENTOR.
Jeannette French
BY
Frederick S. Parker
ATTORNEY Patented Mar. 25, 1947

2,417,977

UNITED STATES PATENT OFFICE 2,417,977

COOK STOVE AND RANGE

Jeannette French, Kew Gardens, N. Y.

Application March 4, 1943, Serial No. 477,904

5 Claims. (Cl. 219—35)

This invention relates to cook stoves and ranges and my improvements are directed to the production of a simple, inexpensive structure adapted to serve both as a stove or range upon which pots or pans can be placed for cooking or boiling purposes, and as an oven for roasting, broiling, toasting and baking purposes and the like.

The stove, which may be rectangular in form, is provided in its top with a reversible heating unit, which in one form of my invention includes a recessed porcelain or refractory plate that carries a resistance element, with means for the inclusion of said element in an electrical circuit, said unit being capable of exposing its heating surface upwardly, for the support of a culinary vessel, and, upon reversal of presenting such heating surface to the interior of the stove which is thereby converted into an oven.

Other features and advantages of my invention will hereinafter appear.

In the drawings—

Figure 1 is a top plan view of my improved stove.

Fig. 2 is a section on the line 2—2 of Fig. 1.

Fig. 3 is a section on the line 3—3 of Fig. 1.

Fig. 6 is a section on the line 6—6 of Fig. 4.

Fig. 7 is a section on the line 7—7 of Fig. 4.

Fig. 8 is a section on the line 8—8 of Fig. 4.

Fig. 9 is a top view of a gas range embodying the inventive features of the gas stove, and Fig. 10 is a section on the line 10—10 of Fig. 9.

Figures 4, 5:
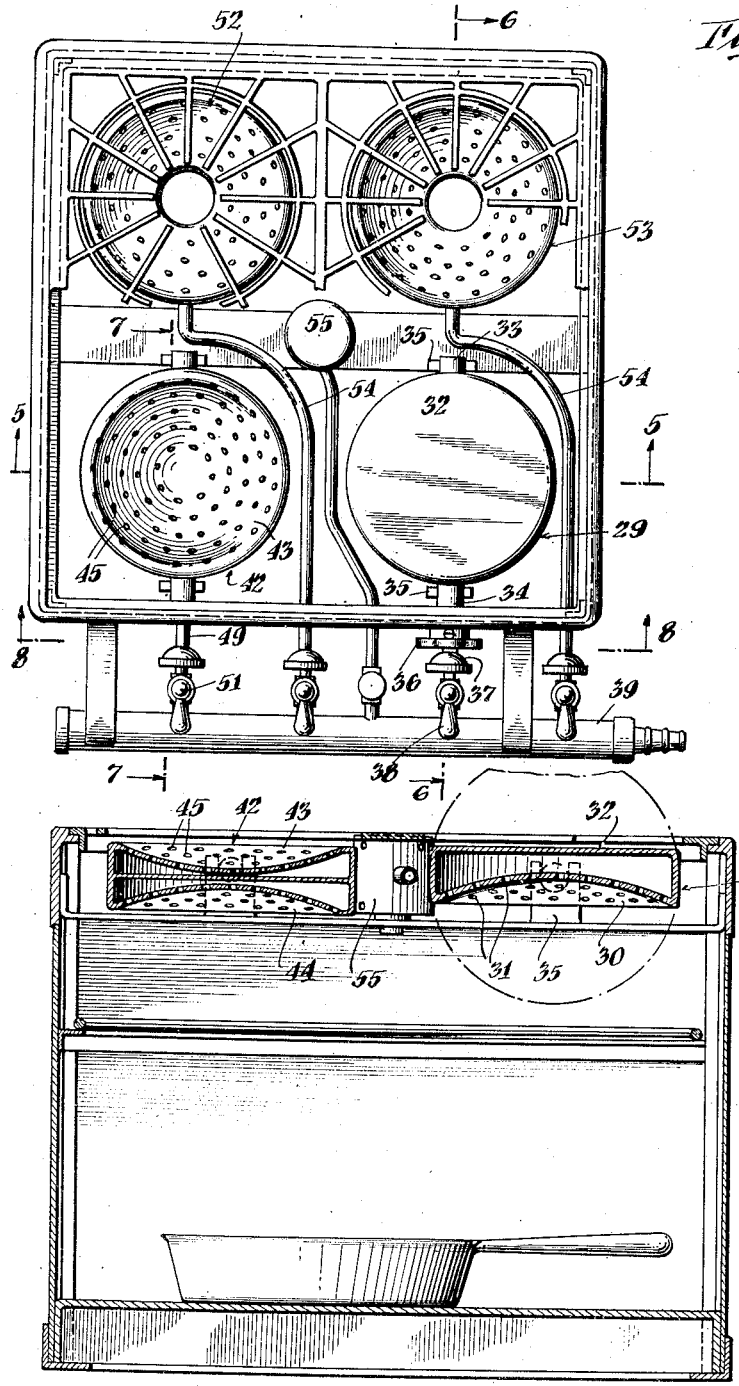
Fig. 4 is a top view of a gas stove that is shown as provided with two stationary gas burners that may be of usual character, and other burners of which one may be rotatable to present its heating surface directed either upwardly or downwardly, and another burner is stationary and has means for heat direction either upwardly or downwardly governed by a two-way gas supply.
Fig. 5 is a section on the line 5—5 of Fig. 4.

In views 1 to 3 I have shown a box-like structure having the walls 1, top 2, base 3 and door 4, which may all be hollow, to be non-conducting of heat, or may if desired be filled with asbestos or other material which is non-conducting of electricity.

The interior of the casing, comprising an oven, is shown as fitted with supports 5 for a foraminous tray 6 or the like on which food or food containers may be placed for cooking, and a drip pan 7 is shown on the oven base.

The particular feature of my invention however consists in the provision of a reversible heating unit which is journalled in an opening 8 formed in the oven top. Said heating unit consists of a disk 9 composed of porcelain or other refractory material, having on one side the grooves 10, in which is embedded an electrical resistance element 11. Said unit is embraced by an encircling ring 12 having opposed flanges 13, 14, the flange 13 engaging the outer surface of disk 9 and the flange 14 engaging a plate 15 that forms a base for the unit. Entered and secured within the ring 12 is a stud 16 which is pivoted in a bearing 17 that itself depends from and is secured to top 2 of the oven, whilst, in opposite relation to stud 16 is a tubular member 18 that is entered through ring 12, to which it is secured. Said member 18, at its inner end has a thread with which a nut 19 is engaged to bind member 18 to ring 12. Member 18 is journalled in a bearing 20 that is secured to the top 2 and in a bearing 21 formed in the casing wall. The outer end of member 18 projects through an orifice 21' formed in a box 22 attached to the casing wall, and there provided with a handle 23 for the operation of the unit. Mounted on box 22 is a switch 24 and extending from said switch is a lead 25 which connects through member 18 with the resistance element 11 of the electrical unit. Also extending from the switch is a connector 26 which may have a plug (not shown) for insertion in an electric light socket. Holes 27 in the casing wall, at opposite sides of member 18 are provided to receive a detent 28 carried by handle 23, to localize said handle when it has been swung to turn the unit, to thus position said unit either with the exposed resistance element uppermost or as face downwardly to direct its heat waves into the oven interior.

At the front wall of the casing I have shown the door 4 for the oven, which door may be suitably hinged, as is obvious. Said door may carry a thermometer to register the oven heat and may also carry a transparent port hole for observation purposes, neither of these elements being illustrated as forming no part of my invention.

Obviously my invention of a reversible heating unit for cook stoves is equally applicable where gas is employed as the heating element, only in such cases instead of the refractory carrying a resistance element it will carry gas burners, and the tubular member 18, instead of serving as a conduit for a lead 25 may serve for gas passage from a suitable external source of supply.

In the example of my invention illustrated in Figs. 4 to 8, where it appears as employing gas burners to provide heat for cooking purposes, there are shown four burners in the stove, although the number of burners to be employed is immaterial, since one only or any other number may be provided.

It is to exemplify the different types of gas burners comprehended in my invention that a plurality of burners are herein exhibited in a single stove. Thus, at 29 there is shown a hollow burner, having one side 30 pierced with orifices 31 for issuance of gas, and its opposite side is plain or unpierced. This burner is provided at opposite points in its wall with a stud 33 and a tubular member 34 which are respectively journalled in bearing members 35 that are carried by the stove structure. An operating flanged nut 36 is fitted and secured upon the projecting end of tubular member 34 and serves as means whereby the burner may be rotated and caused to present its burner orifices either upwardly or downwardly directed. Thus with the burner rotated to present its gas orifices upwardly directed cooking may be effected on top of the burner, while the imperforate or plain side 32 of the burner will then provide moderate heat downwardly to the oven. But, when the burner is reversed, then the gas orifices will be presented downwardly to direct the main heat toward the oven, and only moderate heat will rise from the imperforate or plain side 32 of the burner.

Gas is supplied to the burner by a fitting 37 that is entered into tubular member 34, controlled by a cock 38 from the usual supply pipe 39.

The oven door 40 may have fastening means such for example as that shown at 41.

Instead of the reversible burner 29 I may secure the effect of either upwardly or downwardly directed gas heat, or both upwardly and downwardly directed gas heat in a stationary burner, such as is shown at 42 in Figs. 4, 5 and 7. Here the burner appears in a fixed position with its upper and lower sides 43 and 44 both pierced with gas orifices 45. But the space within the burner is divided by a partition 46 that separates the upper and lower gas orifices, thereby providing individual spaces 47 and 48 for the supply of gas to the respective sets of orifices. These individual spaces are supplied with gas from separate supply pipes, a pipe 49 being directed into burner space 47 and a pipe 50 being directed into space 48. The pipes 49, 50 are respectively controlled by cocks 51 that enable gas to flow from the main pipe 39.

As has been stated, by the dual burner described, gas flames may be directed either upwardly or downwardly or, on occasion, both upwardly and downwardly.

The stationary burners 52, 53, have only upwardly directed gas orifices and are supplied with gas from main pipe 39 by the individual pipes 54. A usual pilot burner 55 is also shown.

The gas range 60 illustrated in Figs. 9 and 10, embodies the inventive features of the gas stove, the skirt of the range being indicated at 61, and its legs at 62, which provide a clearance beneath the range for the placement of a pan 63 that may catch falling grease, the pan having a grill covering 64 for broiling purposes.

Variations within the spirit and scope of my invention are equally comprehended by the foregoing disclosure.

I claim:

1. In a stove, an oven having four side walls, a top wall and a bottom wall, a circular opening formed in the top wall thereof, a heating unit positioned in said opening and having diametrically opposite stud shafts journaled in spaced supports extending downwardly into the interior of said oven from said top wall, leaving the exterior surface of said top wall substantially flat, one of said shafts extending laterally through one of said walls, said heating unit having a heating element in one face thereof; means carried on said last shaft for rotating said heating unit from a position where the heating element faces the inside of said oven, to a second position, where said heating element faces upwardly, and means in at least one of said side walls giving access to the interior of said oven.

2. In a stove, an oven having four side walls, a top wall and a bottom wall, a circular opening formed in said top wall, a heating unit positioned in said opening and having diametrically opposite stud shafts journaled in supports extending vertically downward into the interior of said oven from said top wall, at least one of said shafts extending laterally through an opening formed in one of said side walls, said heating unit including a base of refractory material and having a heating element positioned in grooves in one face thereof, means carried on said last shaft for rotating said heating unit from a position where the heating element is positioned inside of said oven to a second position where said heating element is positioned outside of said oven, registry means carried by said last mentioned means for accurately locating said heating unit in either of said positions.

3. In a stove, an oven having four side walls, a top wall, and a bottom wall, a circular opening formed in said top wall, a heating unit positioned in said opening and having diametrically opposite stud shafts journaled in supports extending vertically downward into the interior of said oven from said top wall, at least one of said shafts extending laterally through an opening formed in one of said side walls, said last shaft being hollow and having electrical conductors extending therethrough to said heating element and adapted to be connected to a source of current via a switch mounted on one of said walls, said heating unit including a base of refractory material and having a heating element positioned in grooves in one face thereof, means also carried on said last shaft for rotating said heating unit from a position where the heating element is positioned inside of said oven to a second position where said heating element is positioned outside of said oven, said last means including means for accurately locating said heating unit in either of said positions.

4. In a stove, an oven having four side walls, a top wall and a bottom wall, at least some of said walls carrying thermal insulation, a circular opening formed in the top wall of said oven, a heating unit positioned in said opening and having diametrically opposite stud shafts journaled in supports on said top wall, one of said shafts extending laterally through one of said side walls, said heating unit including a disc composed of porcelain or other refractory material having grooves formed in one face thereof, an electrical resistance element embedded in said grooves, and an encircling ring embracing said disc and secured to said shafts, a handle secured to said last mentioned shaft outside the side wall through which it extends, and a detent carried by said handle adapted to engage a depression formed in said last wall when said heating unit is in a position where said element is positioned inside said oven and adapted to engage a second depression formed in said last wall when said element is positioned outside said oven, and a door in at least one of said side walls giving access to the interior of the oven.

5. In a stove, an oven having four side walls, a top wall and a bottom wall, a circular opening formed in the top wall thereof, a heating unit adjacent to said opening and having diametrically opposite stud shafts journaled in spaced bearing members carried below said top and within said oven, one of said shafts being tubular and extending laterally through one of said walls and carrying electrical conductors connected to said heating unit, means carried on said last shaft for rotating said heating unit from a position where the heating element faces the inside of the oven to a second position where the heating element faces upwardly, and means in at least one of said side walls giving access to the interior of said oven.

JEANNETTE FRENCH.

REFERENCES CITED

The following references are of record in the file of this patent:

UNITED STATES PATENTS

| Number | Name | Date |
|---|---|---|
| 1,550,707 | Moore | Aug. 25, 1925 |
| 1,751,219 | Seamon | Mar. 18, 1930 |
| 2,313,968 | Reich | Mar. 16, 1943 |
| 1,954,235 | Becker et al. | Apr. 10, 1934 |